United States Patent
Yeh et al.

(10) Patent No.: US 8,218,740 B2
(45) Date of Patent: Jul. 10, 2012

(54) METHOD FOR PROVIDING HYSTERESIS TO FLUCTUATING SIGNALING INK

(75) Inventors: Hae Shyong Yeh, Plano, TX (US); Thomas Lynn Ferguson, Carrollton, TX (US); Maureen Rose O'Toole, Plano, TX (US); Steven Eby, Plano, TX (US)

(73) Assignee: Alcatel Lucent, Paris (FR)

( * ) Notice: Subject to any disclaimer, the term of this patent is extended or adjusted under 35 U.S.C. 154(b) by 1381 days.

(21) Appl. No.: 11/880,749

(22) Filed: Jul. 24, 2007

(65) Prior Publication Data
US 2009/0028133 A1 Jan. 29, 2009

(51) Int. Cl.
*H04M 7/00* (2006.01)
*H04L 12/66* (2006.01)

(52) U.S. Cl. ......... 379/114.08; 379/114.09; 379/221.01; 379/230; 379/221.1; 379/221.04

(58) Field of Classification Search ............. 379/221.01, 379/114, 230, 219; 370/236, 230
See application file for complete search history.

(56) References Cited

U.S. PATENT DOCUMENTS

| | | | |
|---|---|---|---|
| 5,870,565 A | 2/1999 | Glitho | |
| 6,614,756 B1 * | 9/2003 | Morgenstern et al. | 370/230 |
| 6,747,955 B1 * | 6/2004 | Archer | 370/236 |
| 6,768,787 B1 * | 7/2004 | Pester, III | 379/32.03 |
| 7,184,538 B1 | 2/2007 | Doskow et al. | |
| 7,391,722 B2 * | 6/2008 | Yeh | 370/229 |
| 2003/0002489 A1 * | 1/2003 | Bulick et al. | 370/354 |
| 2007/0116235 A1 * | 5/2007 | Heinmiller et al. | 379/221.08 |

OTHER PUBLICATIONS

Joachim Zepf and Gerhard Rufa, Congestion and Flow Control in Signaling System No. 7—Impacts of Intelligent Networks and New Services. Apr. 1994, IEEE Journal on Selected Areas in Communications, vol. 12, No. 3, pp. 501-509.*

* cited by examiner

*Primary Examiner* — Davetta W Goins
*Assistant Examiner* — Phan Le
(74) *Attorney, Agent, or Firm* — Garlick & Markison; Holly L. Rudnick

(57) ABSTRACT

A signaling node within a telecommunications network automatically detects that a signaling link is fluctuating in and out of service and provides hysteresis to the fluctuating signaling link. The signaling node includes a link controller that monitors the state(s) of the signaling link over a time period and a link blocking module that blocks the signaling link from carrying SS7 traffic when the signaling link fluctuates between a failed state and a stable state over the time period.

20 Claims, 3 Drawing Sheets

METHOD FOR PROVIDING HYSTERESIS TO FLUCTUATING SIGNALING INK

BACKGROUND OF THE INVENTION

1. Technical Field of the Invention

The present invention relates in general to telecommunications networks, and in particular, to managing signaling within telecommunications networks.

2. Description of Related Art

Signaling System no. 7 (SS7) is a signaling network separate from the voice network that is responsible for transmitting control or signaling messages pertaining to either circuit-related information (e.g., call setup, routing, teardown, etc.) or non-circuit related information (e.g., database query, network management, etc.) between signaling points. Examples of signaling points within the SS7 network include Service Switching Points (SSPs), Signal Transfer Points (STPs) and Service Control Points (SCPs).

SSP's are associated with the telephone switches that originate, terminate and/or route calls within a telephone voice network. For example, an SSP can be a combination of a voice switch and an SS7 switch or an adjunct computer connected to the voice switch. The SSP converts signaling from the voice switch into SS7 signaling messages, which can then be sent to other SSP's through the SS7 network. All SS7 messages travel between SSP's through an STP. The STP serves as the router in the SS7 network. The SCP serves as an interface to various databases that store information pertaining to call services, subscribers and networks. For example, such information can include subscriber services, call routing, calling cards, fraud protection and other relevant information.

All SS7 signaling points are interconnected via bidirectional signaling data links. Typically, there are multiple links, collectively referred to as a linkset, between two adjacent signaling points. In order to maintain a high level of reliability, links must remain available for SS7 traffic at all times, with minimal downtime. When a link fails, the other links within its linkset must accept the traffic from the failed link. However, if a link begins to go in and out of service (a condition called a "bouncing link" or "fluctuating link"), this may trigger successive waves of network management messages. The congestion caused by these messages may then result in waves of Integrated Service Digital Network (ISDN) User Part (ISUP) messages resulting from the initial outage.

To minimize the impact to the signaling network caused by a fluctuating signaling link, the SS7 protocol includes procedures for reducing the frequency of fluctuating signaling links. For example, when a link fails, the link is taken out-of-service and enters an alignment phase during which time the link is resynchronized on both ends of the link. After a link has successfully passed the alignment phase, the link is returned to an in-service state, where messages are transmitted and normal processing is allowed. In addition, the link is placed into a probationary period, which lasts the duration of an extended probation timer. If the link fails during the probationary period, the link is again taken out-of-service and all attempts to place the link into alignment are ignored until a suspension timer expires. The suspension timer is used to prevent links from rapidly fluctuating between in-service and out-of-service states.

However, the current protocol is deficient in that a link can continually fail the extended probation timer, and thus continue to cause significant network impact. In order to effectively resolve a bouncing link problem, a network management user must detect the problem by observation of system reports, and then take manual action to remove the offending link from service. Therefore, what is needed is a method for automatically detecting when a signaling link is repeatedly fluctuating in and out of service.

SUMMARY OF THE INVENTION

Embodiments of the present invention provide a signaling node within a telecommunications network that is capable of automatically detecting that a signaling link is fluctuating in and out of service. The signaling node includes a link controller that monitors the state(s) of the signaling link over a time period and a link blocking module that provides hysteresis to the signaling link when the signaling link fluctuates between a failed state and a stable state over the time period. In an exemplary embodiment, the hysteresis blocks the fluctuating signaling link from carrying SS7 traffic.

In one embodiment, a blocking parameter is set to establish the time period over which the signaling link is monitored. For example, the blocking parameter may indicate a maximum number of times that the signaling link can fail a probationary period set by a probation timer that is initialized upon alignment of a failed signaling link. If, after failure of the signaling link during the probationary period, it is determined that the actual number of times the signaling link has failed the probationary period is equal to the maximum number of times the signaling link can fail the probationary period, the link blocking module blocks the link. In a further embodiment, the signaling node includes a counter, and upon failure of the signaling link during the probationary period, the link blocking module increments the counter by one, compares the current value of the counter to the blocking parameter, and if the current value of the counter is equal to the blocking parameter, blocks the signaling link from carrying SS7 traffic.

In another embodiment, the link controller determines if the signaling link has failed, and if so, aligns the signaling link to enable the signaling link to carry Message Transfer Part (MTP) level two signaling messages while the signaling link is blocked. The link blocking module determines signaling link status information by monitoring errors in the MTP level two signaling messages and provides the signaling link status information to a user via a user interface. In this embodiment, the link blocking module is further operable to receive a manual unblock command from the user via the user interface and to unblock the signaling link upon receipt of the manual unblock command to enable the signaling link to carry SS7 traffic.

In yet a further embodiment, the signaling node includes an unblock parameter indicating a condition under which the signaling link will be unblocked. The link blocking module determines if the condition is met, and unblocks the signaling link when the condition is met.

Embodiments of the present invention further provide a method for providing hysteresis to a fluctuating signaling link coupled between signaling nodes within a signaling telecommunications network. The method includes monitoring the state(s) of the signaling link over a time period, and if the signaling link fluctuates between a failed state and a stable state over the time period, blocking the signaling link from carrying SS7 traffic.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figures 1, 2, 3:
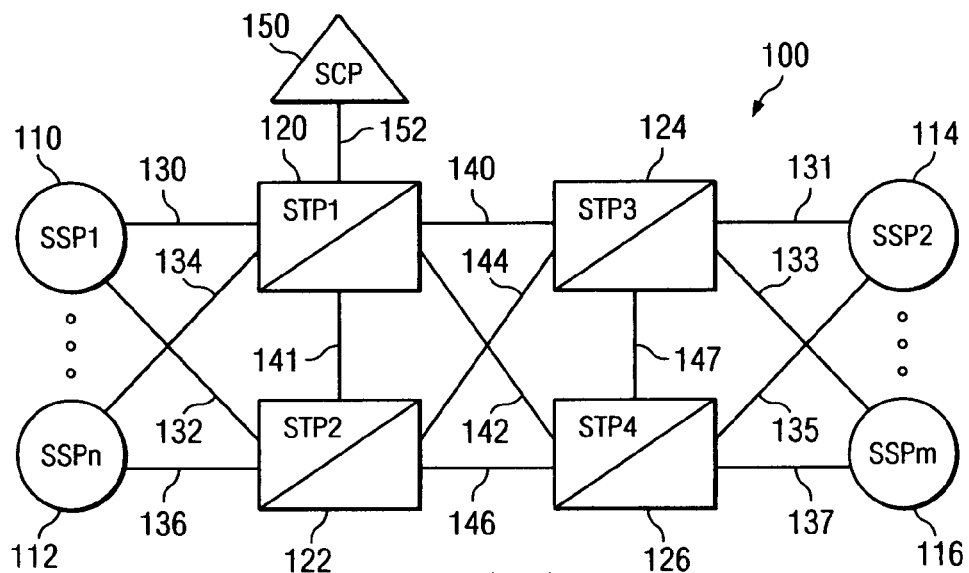
FIG. 1 illustrates an exemplary signaling network, in accordance with embodiments of the present invention.
FIG. 2 is an exemplary timing diagram of a fluctuating signaling link.
FIG. 3 is a block diagram of an exemplary signal transfer point (STP) capable of providing hysteresis to a fluctuating signaling link, in accordance with embodiments of the present invention.

FIG. 1 illustrates an exemplary signaling network 100, in accordance with embodiments of the present invention. In an exemplary embodiment, the signaling network 100 utilizes the Signaling System no. 7 (SS7) network. The signaling network 100 operates to transmit signaling messages related to voice and/or data calls between signaling nodes. Examples of signaling nodes include Service Switching Points (SSPs) 110, 112, 114 and 116, Signal Transfer Points (STPs) 120, 122, 124 and 126 and Service Control Points (SCPs) 150.

The SSPs 110, 112, 114 and 116 each include a voice switch for switching voice and/or traffic over, for example, voice trunks (not shown, for simplicity), and an SS7 switch for switching signaling traffic over SS7 linksets 130-137. Each of the SS7 linksets 130-137 is coupled to an STP 120, 122, 124 and 126 for routing of the signaling traffic within the signaling network 100. The signaling traffic can be either circuit-related traffic, such as ISUP messages pertaining to call setup or teardown, or non-circuit related information, such as Service Connection Control Part (SCCP) messages pertaining to database queries or message transfer part (MTP) messages pertaining to network management. Any SCCP database queries are routed from the STP's 120, 122, 124 and 126 to the SCP 150, via SS7 link 152.

As shown in FIG. 1, redundant pairs of STPs (i.e., STP pair 120, 122 and STP pair 124, 126) are provided to improve signaling reliability within the signaling network 100. However, in other embodiments, only a single STP may be provided for each group of SSPs. As shown in FIG. 1, STP pair 120, 122 and STP pair 124, 126 are interconnected by SS7 linksets 140, 142, 144 and 146. In an exemplary call set-up scenario, to set-up a call between SSP1 110 and SSP2 114, an ISUP call setup message including the origination point code (OPC) of SSP1 110 and destination point code (DPC) of SSP2 114 is sent from SSP1 110 to STP1 120. Upon analyzing the DPC, STP1 120 determines that the ISUP setup message should be routed to STP3 124, and selects one of the linksets (e.g., linkset 140) to route the ISUP setup message to STP3 124. Upon receipt of the ISUP setup message, STP3 124 delivers the ISUP setup message to SSP2 114, which establishes a voice connection for the call. Once the voice circuit is connected, conversation can begin, and no signaling messages are necessary through the SS7 network until either party to the call hangs up.

Referring again to FIG. 1, each mated pair of STPs 120, 122 and 124, 126 is connected by respective cross links 141 and 147. Normal SS7 traffic is not routed over the cross links 141 and 147 unless one of the STPs, e.g., STP1 120, within an STP pair 120, 122 becomes isolated and the only available path is over the cross link 141 between the STP pair 120, 122. For example, if both of the linksets 140 and 142 connecting STP1 120 to STP pair 124, 126 fails, the cross link 141 may be the only available path to route traffic through STP1 120.

In general, when one of the links in a linkset (e.g., linkset 140) fails, the affected signaling nodes (e.g., STP1 120 and STP3 124) will re-route traffic through one of the other available links in the linkset 140. However, if all available links in a particular linkset (e.g., linkset 140) fail, the affected signaling nodes (e.g., STP1 120 and STP3 124) must re-route traffic through one of the other available linksets (e.g., linksets 141, 142 and/or 144). Moreover, if all available linksets coupled to a particular signaling node (e.g., STP1 120) fail (e.g., linksets 140, 141 and 142), such that STP1 120 is now isolated from SSP2 . . . SSPm, STP1 120 will send an SS7 transfer prohibited (TFP) message to its adjacent nodes, i.e., SSP1 . . . SSPn. The TFP message indicates that destination point codes associated with SSP2 . . . SSPm are no longer accessible through STP1 120. Upon receipt of the TFP message, SSP1 . . . SSPn will search for an alternate signaling route in their routing tables, here through STP2 122, and will re-route messages destined for SSP2 . . . SSPm through STP2 122. In the catastrophic case of all available linksets between SSP1 . . . SSPn and SSP2 . . . SSPm, respectively, failing (i.e., linksets 140, 142, 144 and 146), the STPs 120, 122, 124 and 126 will send TFP messages to their adjacent nodes that indicate that such destination point codes are no longer accessible via STP pairs 120, 122 and 124, 126.

In any of the above situations, especially in the isolated and catastrophic situations, once a linkset comes back on-line, waves of Integrated Service Digital Network (ISDN) User Part (ISUP) messages resulting from the initial outage may overwhelm the restored linkset, causing the linkset to go in and out of service. Normally, if a TFP message was sent when the linkset failed, a transfer allowed (TFA) message is sent to the adjacent nodes when the linkset comes back on-line to inform the adjacent nodes that SS7 traffic may once again be routed through that linkset. However, if the linkset is constantly going in and out of service, excessive TFP and TFA messages may flood the network.

Therefore, in accordance with embodiments of the present invention, each STP 120, 122, 124 and 126 is capable of automatically detecting when a link or linkset (herein, collectively referred to as a "signaling link") coupled to that STP is repeatedly fluctuating (i.e., bouncing in and out of service), and is further capable of providing hysteresis to the fluctuating signaling link by placing the signaling link into a new "blocked" state either automatically or in response to a manual command. Once the signaling link is in the new "blocked" state, the signaling link remains in the new "blocked" state until the signaling link is either manually unblocked by a network management user or automatically unblocked after meeting certain predefined criteria.

While the signaling link is in the "blocked" state, the signaling link is not able to carry normal SS7 traffic. However, the signaling link can be aligned and the STPs can monitor Fill-In Signal Unit (FISU) and Status Indicator Processor Outage (SIPO) Message Transfer Part (MTP) level two data for errors, which can provide the user with valuable information on the condition of the signaling link. In addition, the error information can be input to an automatic unblock algorithm to determine if the signaling link has met the predefined criteria for unblocking the signaling link.

For example, referring again to FIG. 1, if one or more links within linkset 130 coupled between SSP1 110 and STP1 120 are fluctuating between in-service states and out-of-service states, STP1 120 is able to detect the fluctuating signaling link(s) and to place the signaling link(s) in the "blocked" state. The blocked state prevents normal SS7 traffic from being sent over the blocked signaling link(s) between SSP1 110 and STP1 120, but does allow for alignment and transmission of level two MTP messages over the blocked signaling link(s) to enable STP1 to monitor the signaling link(s) for errors. If the entire linkset 130 coupled between SSP1 and STP1 120 is fluctuating, and STP1 120 places the linkset 130 in the blocked state, STP1 120 must re-route traffic destined for SSP1 110 through STP2 122 and linkset 132.

In an exemplary embodiment, a new blocking parameter is stored in the STP for each signaling link coupled to that STP. When a signaling link fails, the signaling link is first aligned before being put back into service. Once the alignment process is complete, the probation timer is initialized with a timer value that is equal to the probationary period. If the signaling link subsequently fails again during the probationary period, the STP waits until a suspension timer expires to begin the process of aligning the signaling link again. If the signaling link is continuously failing during the probationary period, that signaling link is said to be "fluctuating." To prevent such fluctuating from occurring, the STP places the signaling link in the new "blocked" state based on the blocking parameter.

In one embodiment, the blocking parameter indicates the maximum number of times (N) the signaling link can fail the probationary period before that signaling link is placed into the new "blocked" state. In operation, after failure of the signaling link, a comparison is made between the actual number of times that the signaling link has consecutively fails the probationary period and the maximum number of times the signaling link is allowed to fail the probationary period. If the actual number of times the signaling link has failed during the probationary period is equal to the maximum number of times the signaling link is allowed to fail the probationary period, the signaling link is blocked.

For example, if the value of N is two, the signaling link is blocked after the signaling link fails two consecutive probationary periods. However, if the value of the blocking parameter (N) is zero, the signaling link is not blocked regardless of how many times the signaling link fails the probationary period, because at a minimum, after failure of the signaling link during the probationary period, the number of times that the signaling link has failed during the probationary period is at least one. Therefore, since the comparison between the actual and maximum number of probationary failures is performed after a failure of the signaling link during the probationary period, the number of times that the signaling link has failed during the probationary period will never equal zero. By setting the blocking parameter N equal to zero, the network management user retains the option of maintaining the current behavior for the signaling link.

FIG. 2 is an exemplary timing diagram of a fluctuating signaling link. As can be seen in FIG. 2, if a signaling link fails at time $t_0$, a delay timer starts to avoid oscillation of link failure and link restart. After the delay timer expires at time $t_1$, the signaling link enters an alignment phase to reestablish the timing and alignment of signal units between the two signaling nodes coupled to the signaling link so that the affected signaling points can determine where signal units begin and end. After the signaling unit has successfully passed the alignment phase, at time $t_2$, the signaling link is returned to an in-service state where normal SS7 traffic is allowed. Once the alignment process is complete and the link is back in-service, the probation timer is initialized with a timer value that is equal to the probationary period. If, at time $t_3$, the signaling link subsequently fails again during the probationary period, the signaling link is again taken out-of-service and all attempts to place the link into alignment are ignored until the expiration of the suspension timer. Thus, when the suspension timer expires at time $t_4$, the signaling link again enters the alignment phase, and once the signaling link is aligned, at time $t_5$, the link is placed in-service and the probation timer is reinitialized.

A more detailed description of an exemplary STP, e.g., STP 120, follows with reference to FIG. 3. As can be seen in FIG. 3, the STP 120 includes a processor 210, memory 220, a linkset I/O controller 230, a user interface 240, a probation timer 250, a delay timer 252, a suspension timer 254 and a counter 260. The memory 220 includes an operating system module 222, a link blocking module 224 a blocking parameter 226 and an unblock parameter 228. The memory 220 includes any type of data storage device, including but not limited to, one or more of a hard drive, random access memory (RAM), read only memory (ROM), flash memory, compact disc, floppy disc, ZIP® drive, tape drive, database or other type of storage device or storage medium.

In accordance with embodiments of the present invention, the processor 210 accesses and runs the operating system module 222 and link blocking module 224 to enable recovery of one or more failed links or linksets associated with the STP 120. In addition, the processor 210 is in communication with the link I/O controller 230 to monitor the state of the failed link(s) or linkset(s), and is further in communication with the user interface 240 to provide the state of the link(s) or linkset(s) to a user and to receive commands from the user. In general, the processor 210 includes one or more processors that are capable of executing the operating system 222 and the link blocking module 224. As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein.

More specifically, the processor 210 is operable to continually monitor the state of one or more signaling links via the link I/O controller 230 and provide the signaling link states to a network management user via the user interface 240. If the state of a signaling link indicates that the signaling link has failed, as normal, the processor 210 may attempt to re-route traffic and/or transmit SS7 TFP messages or changeover/changeback messages to adjacent signaling nodes. In addition, in accordance with embodiments of the present invention, the processor 210 is further operable to execute the link blocking module 224 to detect whether that failed signaling link is repeatedly fluctuating (i.e., bouncing in and out of service), and to provide hysteresis to the fluctuating signaling link by placing the signaling link into a new "blocked" state. For example, the processor 210 may either automatically, or in response to a manual command received via the user interface 240, place the fluctuating signaling link in the blocked state.

Within the memory 220, a blocking parameter 226 is stored for each signaling link coupled to the STP 120. In an exemplary embodiment, the blocking parameter 226 is set to a value corresponding to the maximum number of times (N) the signaling link can fail the probationary period set by a probation timer 250 before that signaling link is placed into the new "blocked" state. The counter 260 is used to count the actual number of times that the signaling link fails the probationary period. At startup, the counter 260 is set to zero.

The processor 210, while executing the link blocking module 224, increments the counter 260 to count the actual number of times that the signaling link has failed the probationary period, and after incrementing the counter 260, compares the current value of the counter 260 to the value of the blocking parameter 226. When the processor 210 determines that the value of the counter 260 is equal to the value of the blocking parameter 226, the processor 210 accesses the link controller 230 to place the signaling link in the blocked state.

In an exemplary operation, when the processor 210 determines that a signaling link has failed, the processor 210 starts the delay timer 252 and waits until the expiration of the delay timer to align the signaling link and put the signaling link back in-service. In addition, once the signaling link is in-service, the processor 210 initializes the probation timer 250 with a timer value that is equal to the probationary period. If the signaling link subsequently fails again during the probationary period, the processor 210 starts the suspension timer 254 and executes the link blocking module 224 to increment the counter 260 and to compare the value of the counter 260 to the value of the blocking parameter 226. If the value of the counter 260 is equal to the value of the blocking parameter 226, the processor 210 blocks the signaling link. If not, the processor 210 waits until the expiration of the suspension timer 254 to align the signaling link and put the signaling link back in-service. Once the signaling link is blocked, the processor 210 resets the counter 260 to zero. Although the above description assumes the blocking parameter is a value related to probation timer failures, it should be understood that in other embodiments, the blocking parameter 226 may include any condition set by a user or the network that can be used to detect a fluctuating signaling link.

Once the signaling link is in the new "blocked" state, the signaling link remains in the new "blocked" state until the signaling link is either manually unblocked by receiving an unblock command from a network management user via the user interface 240 or automatically unblocked after meeting certain predefined criteria or conditions. For manual unblocking, the processor 210 can access the link controller 230 to monitor the signaling link to detect errors in the MTP level two messages that are sent over the blocked signaling link, collect error information related to the detected errors and provide the collected error information to the network management user via the user interface 240. The network management user can use the error information to determine when to unblock the blocked signaling link.

For automatic unblocking, the processor 210 can determine the conditions for automatically unblocking by retrieving an unblock parameter 228 stored within the memory 220. In an exemplary operation, while the signaling link is blocked, the processor 210 continues to execute the link blocking module 224 to determine whether the conditions set by the unblock parameter 228 have been met. If so, the processor 210 accesses the link controller 230 to unblock the signaling link and place that signaling link back in-service.

In one embodiment, the unblock parameter 228 includes an error threshold related to the number or percentage of allowed errors over a period of time for the signaling link. The processor 210 can access the link controller 230 to monitor the errors in MTP level two signaling messages sent over the blocked signaling link, compare the actual errors to the error threshold established by the unblock parameter 228, and if the actual number or percentage of errors during the specified time period is less than the error threshold, the processor 210 can automatically unblock the signaling link. In another embodiment, the unblock parameter 228 can indicate an amount of time that the signaling link should remain blocked. However, the unblock parameter 228 is not limited to the examples given above, but instead represents any condition set by a user or the network under which the signaling link can be unblocked.

Figure 4:
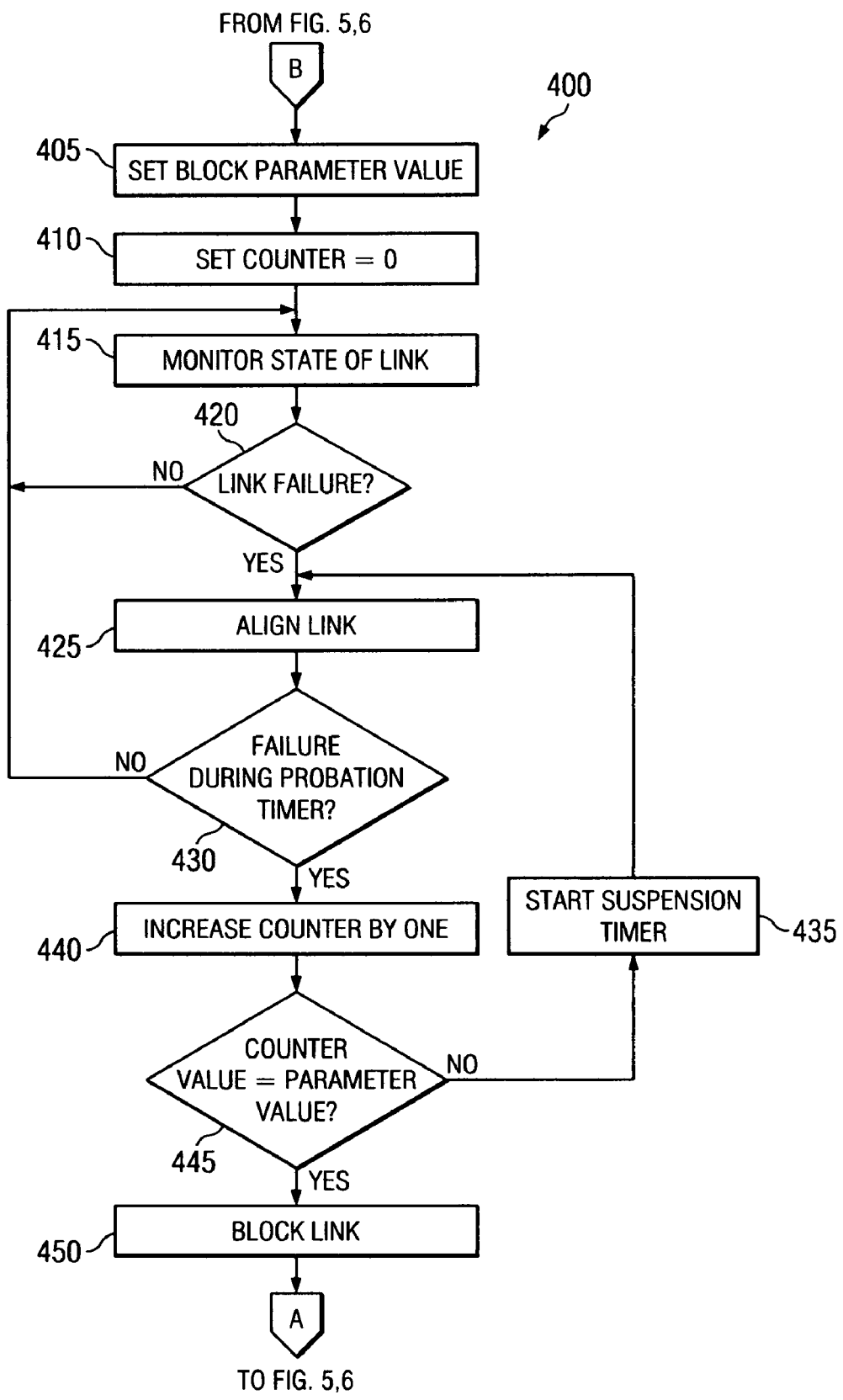
FIG. 4 is a flowchart illustrating an exemplary process for providing hysteresis to a fluctuating link by blocking that link, in accordance with embodiments of the present invention.

FIG. 4 is a flowchart illustrating an exemplary process 400 for providing hysteresis to a fluctuating link by blocking that link, in accordance with embodiments of the present invention. Initially, at block 405, the value of a blocking parameter is set to the maximum number of times that the signaling link is allowed to fail the probationary period set by the probation timer, and at block 410, a counter is set to zero. While the signaling link is in-service, at block 415, the signaling link is continuously monitored to determine if a failure occurs. If the signaling link fails (Y branch of block 420), at block 425, the signaling link is aligned, and at block 430, a determination is made whether the failure occurred during the probationary period. If not (N branch of block 430), the link is monitored for failures again.

If the failure did occur during the probationary period (Y branch of block 430), at block 440, the counter is incremented by one, and at block 445, the value of the counter is compared to the value of the blocking parameter. If the counter value does not equal the blocking parameter value (N branch of block 445), at block 435, the suspension timer is started and link alignment is attempted after the suspension timer expires. However, if the counter value does equal the blocking parameter value (Y branch of block 445), the link is placed in the blocked state to prevent the link from carrying normal SS7 traffic once the link is aligned again.

Figure 5:
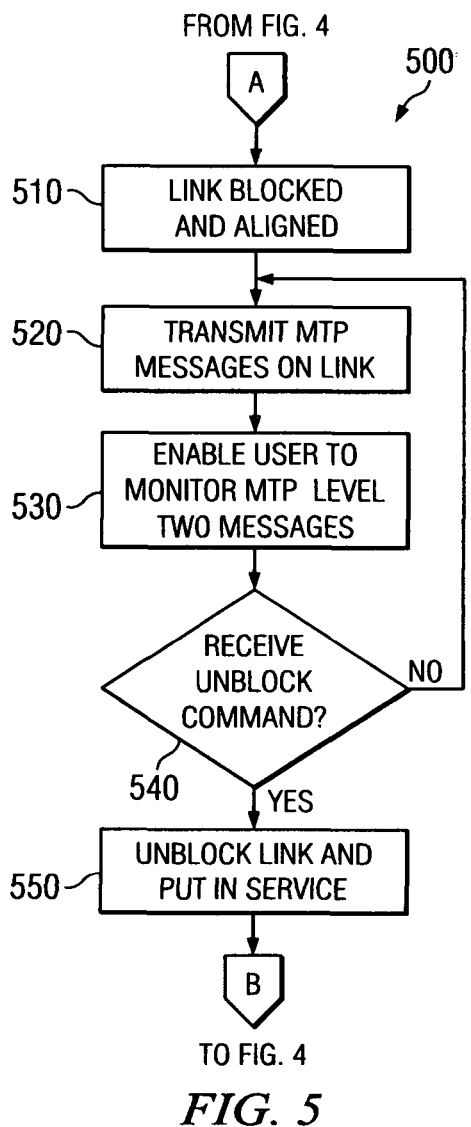
FIG. 5 is a flowchart illustrating an exemplary process for manually unblocking a blocked link, in accordance with embodiments of the present invention.

FIG. 5 is a flowchart illustrating an exemplary process 500 for manually unblocking a blocked link, in accordance with embodiments of the present invention. Continuing from FIG. 4, once the link is blocked (at block 450), at block 510, the link remains blocked and is aligned. After alignment, at block 520, the link is able to carry MTP level two messages, such as FISU and SIPO messages, which at block 530, are monitored by a network management user. If a manual unblock command is received from the user (Y branch of block 540), at block 550, the signaling link is unblocked and placed back in-service to carry normal SS7 traffic. In addition, the process continues with block 405 in FIG. 4. Otherwise (N branch of block 540), at block 520, the signaling link continues to carry only MTP level two messages.

Figure 6:
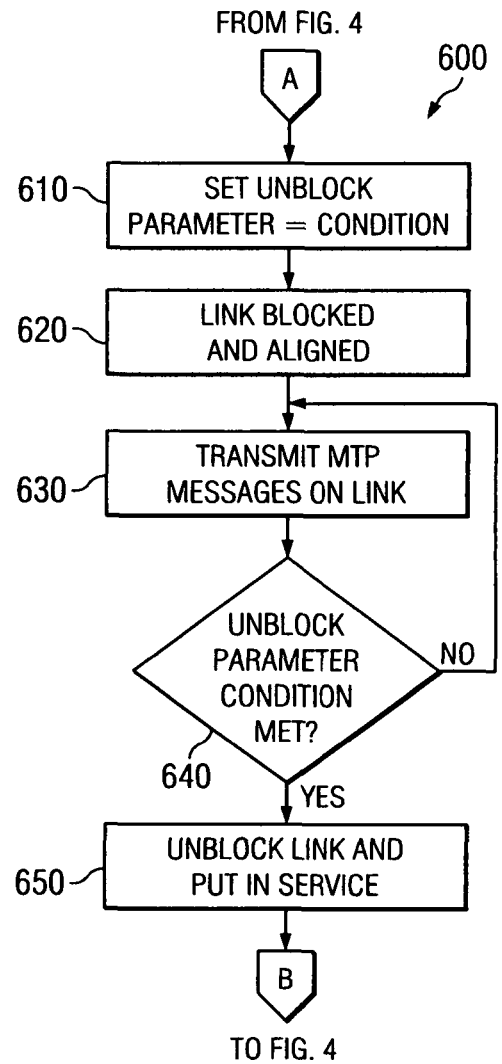
FIG. 6 is a flowchart illustrating an exemplary process for automatically unblocking a blocked link, in accordance with embodiments of the present invention.

FIG. 6 is a flowchart illustrating an exemplary process 600 for automatically unblocking a blocked link, in accordance with embodiments of the present invention. Continuing from FIG. 4, once the link is blocked (block 450), at block 610, an unblock parameter is set to the condition(s) for unblocking the signaling link, and at block 620, the link remains blocked and is aligned. After alignment, at block 630, the link is able to carry MTP level two messages, such as FISU and SIPO messages.

At block 640, a determination is made whether the conditions set by the unblock parameter have been met. For example, such determination can be made by monitoring and/or analyzing errors in the MTP level two messages. As another example, the determination can be made based on the amount of time that has expired since blocking occurred. If the conditions have been met (Y branch of block 640), at block 650, the signaling link is unblocked and placed back in-service to carry normal SS7 traffic. In addition, the process continues with block 405 in FIG. 4. Otherwise (N branch of block 640), at block 630, the signaling link continues to carry only MTP level two messages.

As will be recognized by those skilled in the art, the innovative concepts described in the present application can be modified and varied over a wide range of applications.

Accordingly, the scope of patents subject matter should not be limited to any of the specific exemplary teachings discussed, but is instead defined by the following claims.

We claim:

1. A signaling node within a signaling telecommunications network, comprising:
   a link controller operable to monitor a state of a signaling link coupled between said signaling node and an additional signaling node over a time period; and
   a link blocking module operable to provide hysteresis to said signaling link when said state of said signaling link fluctuates between a failed state and a stable state over said time period, said hysteresis blocking said signaling link from carrying SS7 traffic.

2. The signaling node of claim 1, further comprising a blocking parameter that establishes said time period; and wherein said link blocking module operates to block said signaling link from carrying SS7 traffic based on said blocking parameter.

3. The signaling node of claim 2, wherein:
   said blocking parameter indicates a maximum number of times said signaling link can fail a probationary period set by a probation timer that is initialized upon alignment of said signaling link after failure of said signaling link; and
   said link blocking module operates to, after failure of said signaling link during said probationary period, block said signaling link when an actual number of times said signaling link has failed said probationary period is equal to said maximum number of times said signaling link can fail said probationary period.

4. The signaling node of claim 3, wherein said maximum number of times said signaling link can fail said probationary period is a maximum number of consecutive times said signaling link can fail said probationary period.

5. The signaling node of claim 3, further comprising a counter; and wherein, upon failure of said signaling link, said link blocking module operates to:
   increment said counter by one if said signaling link failed during said probationary period,
   compare a current value of said counter to said blocking parameter, and
   if said current value of said counter is equal to said blocking parameter, block said signaling link from carrying SS7 traffic.

6. The signaling node of claim 1, wherein said link controller operates to determine if said signaling link has failed, and if so, align said signaling link to enable said signaling link to carry Message Transfer Part (MTP) level two signaling messages while said signaling link is blocked.

7. The signaling node of claim 6, further comprising:
   a user interface coupled to provide link status information associated with said signaling link to a user while said signaling link is blocked.

8. The signaling node of claim 7, wherein said link blocking module operates to determine said signaling link status information by monitoring errors in said MTP level two signaling messages and to provide said signaling link status information to said user via said user interface.

9. The signaling node of claim 7, wherein said link blocking module is further operable to receive a manual unblock command from said user via said user interface and to unblock said signaling link upon receipt of said manual unblock command to enable said signaling link to carry SS7 traffic.

10. The signaling node of claim 6, further comprising an unblock parameter indicating a condition under which said signaling link will be unblocked; and wherein said link blocking module operates to determine if said condition is met and to unblock said signaling link when said condition is met.

11. The signaling node of claim 10, wherein said link blocking module operates to determine if said condition is met by monitoring errors in said MTP level two signaling messages.

12. A method for providing hysteresis to a fluctuating signaling link coupled between signaling nodes within a signaling telecommunications network, said method comprising the steps of:
   monitoring a state of said signaling link over a time period; and
   if said state of said signaling link fluctuates between a failed state and a stable state over said time period, blocking said signaling link from carrying SS7 traffic.

13. The method of claim 12, wherein said step of blocking further comprises the step of:
   blocking said signaling link from carrying SS7 traffic based on a blocking parameter that establishes said time period.

14. The method of claim 13, wherein said blocking parameter indicates a maximum number of times said signaling link can fail a probationary period set by a probation timer that is initialized upon alignment of said signaling link after failure of said signaling link; and wherein said step of blocking further comprises the step of:
   after failure of said signaling link during said probationary period, blocking said signaling link when an actual number of times said signaling link has failed said probationary period is equal to said maximum number of times said signaling link can fail said probationary period.

15. The method of claim 14, wherein said maximum number of times said signaling link can fail said probationary period is a maximum number of consecutive times said signaling link can fail said probationary period.

16. The method of claim 14, wherein said step of blocking further comprises the steps of:
   upon failure of said signaling link during said probationary period, incrementing a counter by one;
   comparing a current value of said counter to said blocking parameter, and
   if said current value of said counter is equal to said blocking parameter, blocking said signaling link from carrying SS7 traffic.

17. The method of claim 12, further comprising the steps of:
   determining if said signaling link has failed; and
   if so, aligning said signaling link to enable said signaling link to carry Message Transfer Part (MTP) level two signaling messages while said signaling link is blocked.

18. The method of claim 17, further comprising the steps of:
   determining signaling link status information by monitoring errors in said MTP level two signaling messages; and
   providing said link status information to a user while said signaling link is blocked.

19. The method of claim 18, further comprising the steps of:
   receiving a manual unblock command from said user; and
   unblocking said signaling link upon receipt of said manual unblock command to enable said signaling link to carry SS7 traffic.

20. The method of claim 12, further comprising the steps of:
   defining an unblock parameter indicating a condition under which said signaling link will be unblocked; and unblocking said signaling link when said condition is met.

* * * * *